Nov. 15, 1932. K. BOERE 1,887,796
CLOD CUTTER
Filed April 12, 1930
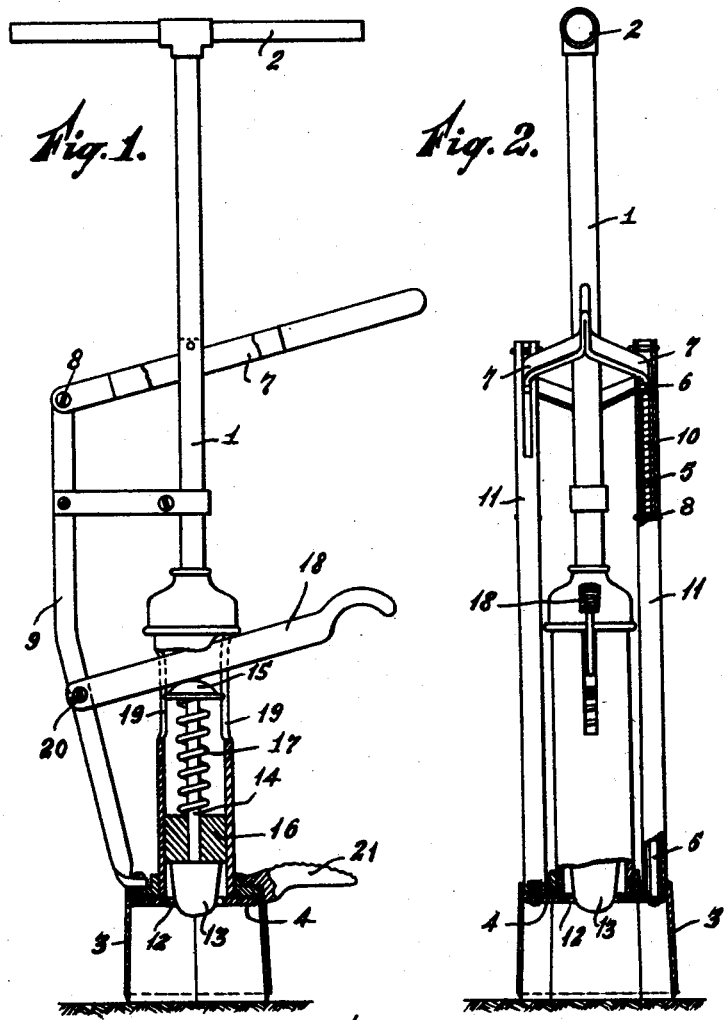

Patented Nov. 15, 1932

1,887,796

UNITED STATES PATENT OFFICE

KORNELIS BOERE, OF CAPELLE, NETHERLANDS

CLOD CUTTER

Application filed April 12, 1930, Serial No. 443,797, and in the Netherlands April 17, 1929.

One of the purposes of the horticulturists has been of late to eliminate the use of flower-pots in which the seed plants are cultivated during the winter season, in order to be planted out on the open ground in the following spring. The use of flower-pots has the drawback that the seed-plant growing therein is exposed to pot-sickness, which is caused by the fact that the roots of the plant cannot freely develop, but become entangled.

In order to remove this drawback so-called plant-pots are used, by which are meant compressed clods of earth, in which the seed-plants are planted and grow during the winter-season. In the following spring the plant is transferred together with the earthen clod to the open ground. As the roots of the seed-plants can freely develop in these plant-pots sound plants will be obtained.

According to my invention a clod cutter is constructed with which plantpots can be made in a simple manner, which plantpots answer the highest requirements.

According to my invention the ejector is provided with a central opening, through which a stationary or also axially movable mandrel reaches. The ejector and the mandrel may be moved by independently operated lever-systems. In order to support the compressing action of the mandrel, the cutter may gradually become narrower in the direction from its open inlet side to the bottom.

By applying the apparatus according to my invention, it is possible to cut clods directly from the soil, which clods may serve as plantpots without further treatment.

For illustrating the invention, an emobdiment of my clodcutter will hereinafter be described by way of example with reference to the drawing.

Fig. 1 is a front-elevation, partially in longitudinal section of the clod-cutter.

Fig. 2 is a side-elvation, partially in cross-section;

Fig. 3 is an elevation, partially in section of a clod cut with the apparatus according to my invention.

According to Figs. 1 and 2 the clod-cutter consists of a shaft 1, to which at its upper end a handle 2 and at its lower end a tubular cutter 3 is provided. The bottom of this cutter is formed by an ejector 4, to which two substantially vertical rods 5 are mounted. These rods end at the top in a press button 6, on which the levers 7 rest. Said levers are hingedly connected at 8 to a supporting rod 9. The levers 7 are guided in the sleeved upper ends 11 of hollow tubes and are each pressed upwards by a screw-spring 10.

In the ejector 4 a central opening 12 is provided, through which a mandrel 13 reaches. This mandrel 13 is provided with a shaft 14 ending in a pressbutton 15. The shaft is guided through a block 16, whereas the mandrel with its shaft and pressbutton and the guiding-block are lodged in an enlarged part of the shaft 1. Between pressbutton and guiding block a screw spring 17 is provided around the shaft 14, causing the mandrel 13 to be kept in retracted position. On the pressbutton 15 a lever 18 rests, which reaches through slots 19 of the shaft 1 and is hingedly mounted at 20 to the supporting rod 9.

In cutting clods the tubular cutter 3, whose lower edge is sharpened, is vertically driven into the soil by placing the foot on the pedal 21. As the cutter 3 becomes gradually narrower in the direction from the lower edge to the bottom, the clod surrounded by the cutter is compressed radially inwardly.

When the cutter is brought into the soil up to the ejector 4, the mandrel 13 is pressed into the clod by exerting pressure on the lever 18. This makes not only a hole in the clod, but moreover the clod is compressed hereby from the interior to the exterior. By the narrowing of the cutter and by introducing the mandrel in the clod, the latter is compressed as well from outside to the inside as from the interior to the exterior, which strongly increases the cohesion of the earth particles. After disengaging the lever 18, the mandrel rebounds, after which the cutter, together with the compressed clod is drawn out of the soil, and then the clod 22 (Fig. 3) is ejected by pressing down the lever 7, after which this compressed clod is ready to receive a plant, which is planted in the hole 23 by means of some loose soil.

These clods with the seed-plants placed therein are kept during the winter season in hot houses, so as to be transferred to the open ground in the following spring season.

Owing to the fact that the clod-cutter according to my invention is easily operable, the clods- or plant-pots production is very high without requiring special skill.

I claim:

1. A clod cutter comprising a shaft having a tubular cutter at its lower end, an axially movable downwardly directed mandrel arranged in the cutter and an axially movable ejector in the cutter forming the upper side thereof and having a central opening through which the mandrel is arranged to pass, and independently operable levers one for moving the ejector and the other for moving the mandrel.

2. Apparatus for cutting and pressing earthen transplanting pots comprising a shaft having a tubular cutter at its lower end, an axially movable ejector within the cutter forming the upper side thereof and having a central opening, and an independently downwardly directed mandrel, adapted to move axially and to pass through the central opening in the ejector.

In testimony whereof I affix my signature.

KORNELIS BOERE.